(12) United States Patent
Leng et al.

(10) Patent No.: US 11,303,671 B2
(45) Date of Patent: Apr. 12, 2022

(54) REPLAY SPOOFING DETECTION FOR AUTOMATIC SPEAKER VERIFICATION SYSTEM

(71) Applicant: Visa International Service Association, San Francisco, CA (US)

(72) Inventors: Mengjun Leng, Foster City, CA (US); Sunpreet Singh Arora, San Mateo, CA (US); Kim Wagner, Sunnyvale, CA (US)

(73) Assignee: Visa International Service Association, San Francisco, CA (US)

( * ) Notice: Subject to any disclaimer, the term of this patent is extended or adjusted under 35 U.S.C. 154(b) by 169 days.

(21) Appl. No.: 16/535,836

(22) Filed: Aug. 8, 2019

(65) Prior Publication Data
US 2020/0053118 A1    Feb. 13, 2020

Related U.S. Application Data

(60) Provisional application No. 62/717,679, filed on Aug. 10, 2018.

(51) Int. Cl.
*H04L 29/06* (2006.01)
*G06N 3/04* (2006.01)
*G06N 3/08* (2006.01)

(52) U.S. Cl.
CPC .......... *H04L 63/1466* (2013.01); *G06N 3/04* (2013.01); *G06N 3/08* (2013.01); *H04L 63/0861* (2013.01)

(58) Field of Classification Search
CPC ... H04L 63/1466; H04L 63/0861; G06N 3/04; G06N 3/08; G06N 20/00
See application file for complete search history.

(56) References Cited

U.S. PATENT DOCUMENTS

| | | | |
|---|---|---|---|
| 7,107,107 B2 * | 9/2006 | Morikawa | G06N 20/00 700/31 |
| 9,472,188 B1 * | 10/2016 | Ouimette | G10L 15/1815 |
| 2016/0063397 A1 * | 3/2016 | Ylipaavalniemi | G06N 20/00 706/12 |
| 2017/0177925 A1 * | 6/2017 | Volkart | B64C 39/024 |
| 2017/0228662 A1 * | 8/2017 | Gu | G06N 3/0427 |
| 2017/0364829 A1 * | 12/2017 | Fyffe | G06N 20/00 |

(Continued)

OTHER PUBLICATIONS

Poojan et al., ("One-Class Convolutional Neural Network"), Jan. 24, 2019 (Year: 2019).*

(Continued)

*Primary Examiner* — Tongoc Tran
(74) *Attorney, Agent, or Firm* — Kilpatrick Townsend & Stockton LLP

(57) ABSTRACT

Described herein are a system and techniques for detecting whether biometric data provided in an access request is genuine or a replay. In some embodiments, the system uses an machine learning model trained using genuine and replay sample data which is optimized in order to produce a result set in which results for the genuine samples are pulled closer to a genuine center and results for the replay samples are pushed away from the genuine center. Subjecting input biometric data (e.g., an audio sample) to the trained model results in a classification of the input biometric data as genuine or replay, which can then be used to determine whether or not to verify the input biometric data.

12 Claims, 7 Drawing Sheets

(56) References Cited

U.S. PATENT DOCUMENTS

| | | | |
|---|---|---|---|
| 2018/0165603 A1* | 6/2018 | Van Seijen | G06N 3/084 |
| 2018/0336464 A1* | 11/2018 | Karras | G06N 3/0472 |
| 2019/0109863 A1* | 4/2019 | Traore | H04L 63/126 |
| 2019/0180469 A1* | 6/2019 | Gu | G06N 3/08 |
| 2019/0311261 A1* | 10/2019 | Baldwin | G06N 3/049 |
| 2019/0319977 A1* | 10/2019 | Gottschlich | H04L 63/1408 |
| 2019/0385019 A1* | 12/2019 | Bazrafkan | G06N 3/088 |
| 2019/0385061 A1* | 12/2019 | Chaudhury | G06N 3/0481 |

OTHER PUBLICATIONS

Cai et al., "Countermeasures for Automatic Speaker Verification Replay Spoofing Attack : On Data Augmentation, Feature Representation, Classification and Fusion", Interspeech, Available Online at: http://dx.doi.org/10.21437/Interspeech, Aug. 20-24, 2017, pp. 17-21.

Chen et al., "ResNet and Model Fusion for Automatic Spoofing Detection", Interspeech, Available Online at: http://dx.doi.org/10.21437/Interspeech, Aug. 20-24, 2017, pp. 102-106.

Nagarsheth et al., "Replay Attack Detection using DNN for Channel Discrimination", Interspeech, Available Online at: http://dx.doi.org/10.21437/Interspeech, Aug. 20-24, 2017, pp. 97-101.

Chalapathy et al., "Anomaly Detection using One-Class Neural Network", arXiv:1802.06360v2 [cs.LG], Cornell University Library, Feb. 18, 2018, pp. 1-13.

EP19190937.3, "Extended European Search Report", dated Dec. 17, 2019, 9 pages.

Nikisins et al., "On Effectiveness of Anomaly Detection Approaches against Unseen Presentation Attacks in Face Anti-spoofing", International Conference on Biometrics (ICB), IEEE, Feb. 2018, 7 pages.

Zhang et al., "The Application of One-Class Classifier Based on CNN in Image Defect Detection", Procedia Computer Science, vol. 114, Oct. 30, 2017, pp. 341-348.

Y. Wen et al., "A discriminative feature learning approach for deep face recognition," in *European Conference on Computer Vision*, 17 pages, 2016.

A. v. d. Oord et al., "WaveNet: A generative model for raw audio," in *ISCA Speech Synthesis Workshop*, pp. 1-15, 2016.

G. Lavrentyeva et al., "Audio replay attack detection with deep learning frameworks". In proc. Interspeech, pp. 82-86, 2017.

B. Chettri et al., A Study on Convolutional Neural Network Based End-To-End Replay AntiSpoofing. *arXiv preprint* arXiv:1805.09164, 6 pages, 2018.

19190937.3, "EP Office Action", dated Dec. 8, 2021, 6 pages.

* cited by examiner

REPLAY SPOOFING DETECTION FOR AUTOMATIC SPEAKER VERIFICATION SYSTEM

CROSS REFERENCE TO RELATED APPLICATIONS

This non-provisional application claims priority to U.S. patent application Ser. No. 62/717,679, filed on Aug. 10, 2018, the disclosure of which is herein incorporated by reference in its entirety for all purposes.

BACKGROUND

Automatic speaker verification (ASV) systems are actively used in call-centers, interactive voice response systems and mobile applications to verify an enrolled user. There are four major types of spoofing attacks that can be carried out on ASV systems: human impersonation, replay, speech synthesis, and voice conversion. Compared to other spoofing types, replay attacks typically do not need additional knowledge in audio signal processing, are more likely to be used by non-professional impersonators and hence are easily scalable. Current replay detection methods and systems extract spectrum-related features from input audio files.

In most existing replay detection systems, two steps are involved. In the first step, spectrum-related features (e.g., mel-frequency cepstral coefficients (Chen Z, Xie Z, Zhang W, Xu X. ResNet and Model Fusion for Automatic Spoofing Detection. In INTERSPEECH 2017 August, pp. 102-106), constant q cepstral coefficients (Nagarsheth P, Khoury E, Path K, Garland M. Replay Attack Detection Using DNN for Channel Discrimination. In Interspeech 2017 August, pp. 97-101), and log power magnitude spectrum (Cai W, Cai D, Liu W, Li G, Li M. Countermeasures for Automatic Speaker Verification Replay Spoofing Attack: On Data Augmentation, Feature Representation, Classification and Fusion. In INTERSPEECH 2017, pp. 17-21)) are extracted. Then the replay detection is mapped into a binary classification problem (genuine vs. replay) based on the spectrum features. Different classification techniques, like convolutional neural networks (CNN), Gaussian mixture models (GMM), or support vector machines (SVM) are then applied. However, one of the major limitations of these approaches is that they don't generalize well to unseen replay configurations (e.g., with different background noises, using different replay and recording devices).

Embodiments of the invention address these and other problems individually and collectively.

BRIEF SUMMARY

Embodiments of the disclosure are directed to a system and techniques for detecting whether biometric data provided in an access request is genuine or a replay. In some embodiments, the system uses an artificial intelligence model trained using genuine and replay sample data which is optimized in order to produce a result set in which results for the genuine samples are closer to a genuine center and results for the replay samples are further away from the genuine center. Subjecting input biometric data (e.g., an audio sample) to the trained model results in a classification of the input biometric data as genuine or replay, which can then be used to determine whether or not to verify the input biometric data.

One embodiment of the invention is directed to a method comprising training an machine learning model by: providing a set of genuine sample data; providing a set replay sample data; and optimizing the machine learning model such that results of the set of genuine sample data are closer to a genuine center and the results of the set of replay sample data are further away from the genuine center. The method further comprises receiving input biometric data associated with a user, subjecting the input biometric data to the machine learning model resulting in a classification as genuine or replay, and determining, by the service provider computer, whether or not to verify the input biometric data based on the classification.

Another embodiment of the invention is directed to a service provider computer comprising a processor; a memory; and a computer readable medium coupled to the processor, the computer readable medium comprising code, executable by the processor, to implement a method comprising: training an machine learning model by: providing a set of genuine sample data, providing a set replay sample data, and optimizing the machine learning model such that results of the set of genuine sample data are closer to a genuine center and the results of the set of replay sample data are further away from the genuine center. The method further comprises receiving input biometric data associated with a user, providing the input biometric data to the machine learning model as input resulting in classification as genuine or replay, and determining whether or not to verify the input biometric data based on the classification.

Further details regarding embodiments of the invention can be found in the Detailed Description and the Figures.

DETAILED DESCRIPTION

Figure 1:
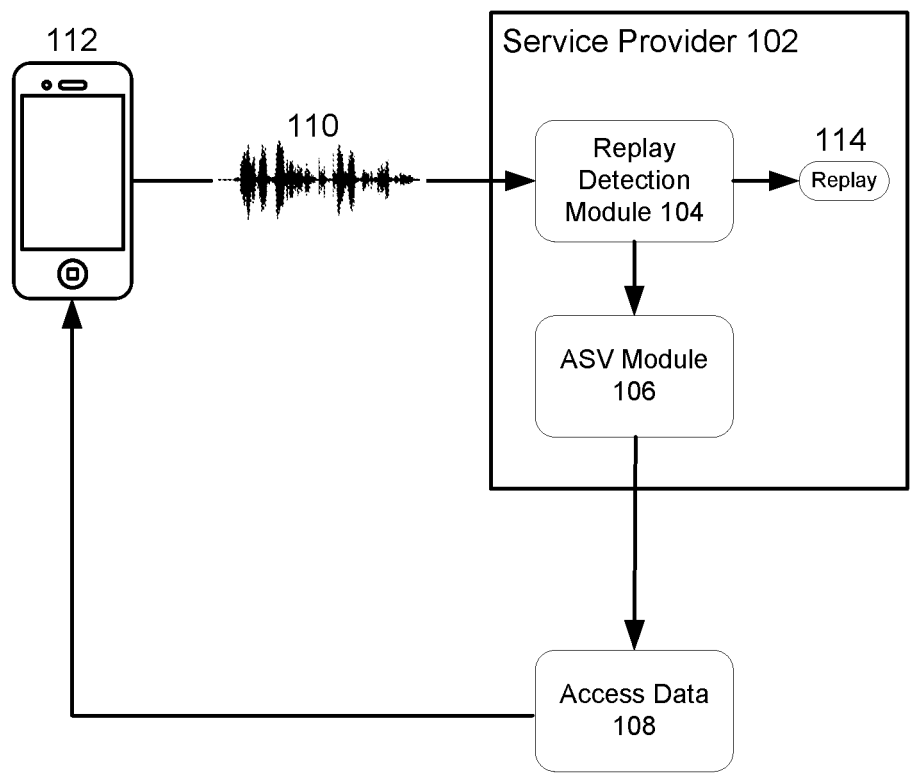
FIG. 1 depicts an illustrative overview of a service provider 102 capable of detecting replay spoofing in accordance with the disclosure.

Embodiments of the invention allow for the determination of whether input raw audio data is genuine (e.g., corresponds to a live recording of a human voice) or a replay (e.g., a fake recording). Embodiments of the invention utilize a neural network machine learning model using a one-class classification technique to classify audio data in accordance with the disclosure.

Prior to discussing embodiments of the invention, some terms can be described in further detail.

An "application" or "software application" may be a computer program that is used for a specific purpose.

An "artificial neural network" or "neural network" is type of machine learning model intended to simulate the human brain and nervous system. Generally, an artificial neural network represents a network of interconnected nodes, similar to a biological neural network, where knowledge about the nodes is shared across output nodes and knowledge specific to each output node is retained. Each node represents a piece of information. Knowledge can be exchanged through node-to-node interconnections and node-to-task connections. Input to the artificial neural network activates a set of nodes. In turn, this set of node activates other nodes, thereby propagating knowledge about the input. At each set of nodes, transformative functions may be applied to the data. This activation process is repeated across other nodes until an output node is selected and activated. A convolution neural network (CNN) is a type of neural network that can exploit the spatial structure of data (e.g. audio files) to classify the data. To do this, a CNN may include one or more of a convolutional layer, a fully connected layer, and a pooling layer.

"Authentication" may include a process for verifying an identity of something (e.g., a user). One form of authentication can be biometric authentication.

A "biometric" may be any human characteristic that is unique to an individual. For example, a biometric may be a person's fingerprint, voice sample, face, DNA, iris, etc.

A "biometrics interface" may be an interface across which biometrics information is captured. Biometrics interfaces include a thumb print scanner, an iris or retina scanner, a camera, a microphone, a breathalyzer, etc. Biometrics interfaces may be present on user devices, such as mobile devices, or present at an access terminal.

A "biometric reader" may include a device for capturing data from an individual's biometric sample. Examples of biometric readers may include fingerprint readers, front-facing cameras, microphones, and iris scanners.

A "biometric sample" or "biometric information" may include biometric data obtained by any type of input sensor. The data may be either an analog or digital representation of the user's biometric attributes, generated prior to determining distinct features needed for matching. For example, a biometric sample of a user's face may be image and/or depth data. In another example, a biometric sample of a user's voice may be audio data.

A "computing device" may be any suitable device that can receive and process data. Examples of computing devices may include access devices, transport computers, processing network computers, or authorization computers.

A "convolution layer" is one type of layer typically included in a convolutional neural network architecture. A convolution layer may consist of many kernels (sometimes called convolution filters) which are configured to learn local features of a provided input data. Local features learned by the convolution layer are typically arranged in a feature map. The features are then convolved over the data, which results in a matrix or activation map.

A "fully connected layer" is one type of layer typically included in a convolutional neural network architecture. Fully connected layers connect every neuron in one layer to every neuron in another layer. Fully connected layers are responsible for producing different activation patterns based on the set of activated features mapped within the input data.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "pooling layer" is one type of layer typically included in a convolutional neural network architecture. A pooling layer is typically used to make identified features invariant.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "replay spoof" may include any attempt to access a system secured by biometric authentication by reproducing a biometric sample. For example, for a system that may be accessed using voice recognition, a replay spoof may include a user attempting to access an account of the system by playing a recorded voice sample of the owner of the account.

A "server computer" may include a powerful computer or cluster of computers. For example, the server computer can be a large mainframe, a minicomputer cluster, or a group of servers functioning as a unit. In one example, the server computer may be a database server coupled to a Web server. A server computer may be coupled to a database and may include any hardware, software, other logic, or combination of the preceding for servicing the requests from one or more client computers. A server computer may comprise one or more computational apparatuses and may use any of a variety of computing structures, arrangements, and compilations for servicing the requests from one or more client computers.

The term "stride" refers to a metric for regulating the movement of various convolutional filters for pixel-wise operations across a given data space.

A "user" may include an individual. In some embodiments, a user may be associated with one or more personal accounts and/or user devices.

A "user device" may be any suitable device that can interact with a user (e.g., a payment card or mobile phone). A user device may communicate with or may be at least a part of an access device or a server computer. User devices may be in any suitable form. Some examples of user devices include POS devices, cellular phones, PDAs, personal computers (PCs), tablet PCs, wearable devices (e.g., smart watches), vehicles with communication capabilities (e.g., smart cars), etc.

Embodiments can be directed to the problem of replay spoofing detection for automatic speaker verification (ASV) systems. As illustrated in FIG. 1, given a piece of speech audio, the task is to determine whether it is a genuine human voice from live recording, or it is a fake replay recording.

FIG. 1 depicts an illustrative overview of a service provider 102 capable of detecting replay spoofing in accordance with the disclosure. Service provider 102 includes at least a replay detection module 104, but may also include an automatic speaker verification (ASV) module 106, and/or account data 108. The service provider 102 may receive as input raw audio data 110.

The input raw audio data 110 can be in an any suitable format. The input raw audio data 110 can be genuine audio data or replay audio data. Genuine audio data can include a live recording obtained directly from a person. For example, the live recording can be a live recording of a human voice. The live recording of the human voice may be received in real-time by the service provider 102 from the person associated with the human voice. In this example, the person may speak into an input device 112, such as a microphone of a mobile phone, that can be operatively coupled to the replay detector 104. In some embodiments, the person may input a sample of their voice in order to authenticate their identity (and potentially access an account).

The input raw audio data 110 can also be replay audio data. For example, the replay audio data can be audio data recorded by a malicious party and then replayed in proximity to the input device 112. The replay audio data may be audio data recorded from the same person, but on a different recording device. In some embodiments, a malicious party may input the replay audio data in an attempt to impersonate an individual and access his or her account.

In embodiments of the disclosure, the input raw audio data 110 is received by a service provider 102 in a request to access account data 108. The service provider 102 includes a replay detection module 104 capable of determining if the input raw audio data 110 is genuine audio data or replay audio data. In some cases, the service provider 102 may be a verification computer, which also includes an ASV module 106 capable of verifying an identity of the user. The verification computer may be capable of receiving input audio data; classifying the input audio data resulting in a classification; and determining whether or not to verify the input audio data based on the classification. In some cases, the service provider 102 may be separate from a verification server and may provide an assessment of whether the raw audio data 110 is genuine audio data or replay audio data to the verification server, which may then verify the identity of the user only if the raw audio data 110 is determined to be genuine. Upon determining that the raw audio data 110 is a replay 114, the system may reject the received request to access account data 108. Upon determining that the raw audio data 110 is genuine, and upon verification of the raw audio data 110, the service provider 102 may provide access to account data 108, which may be sensitive data related to a particular account.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications protocol.

Figure 2:
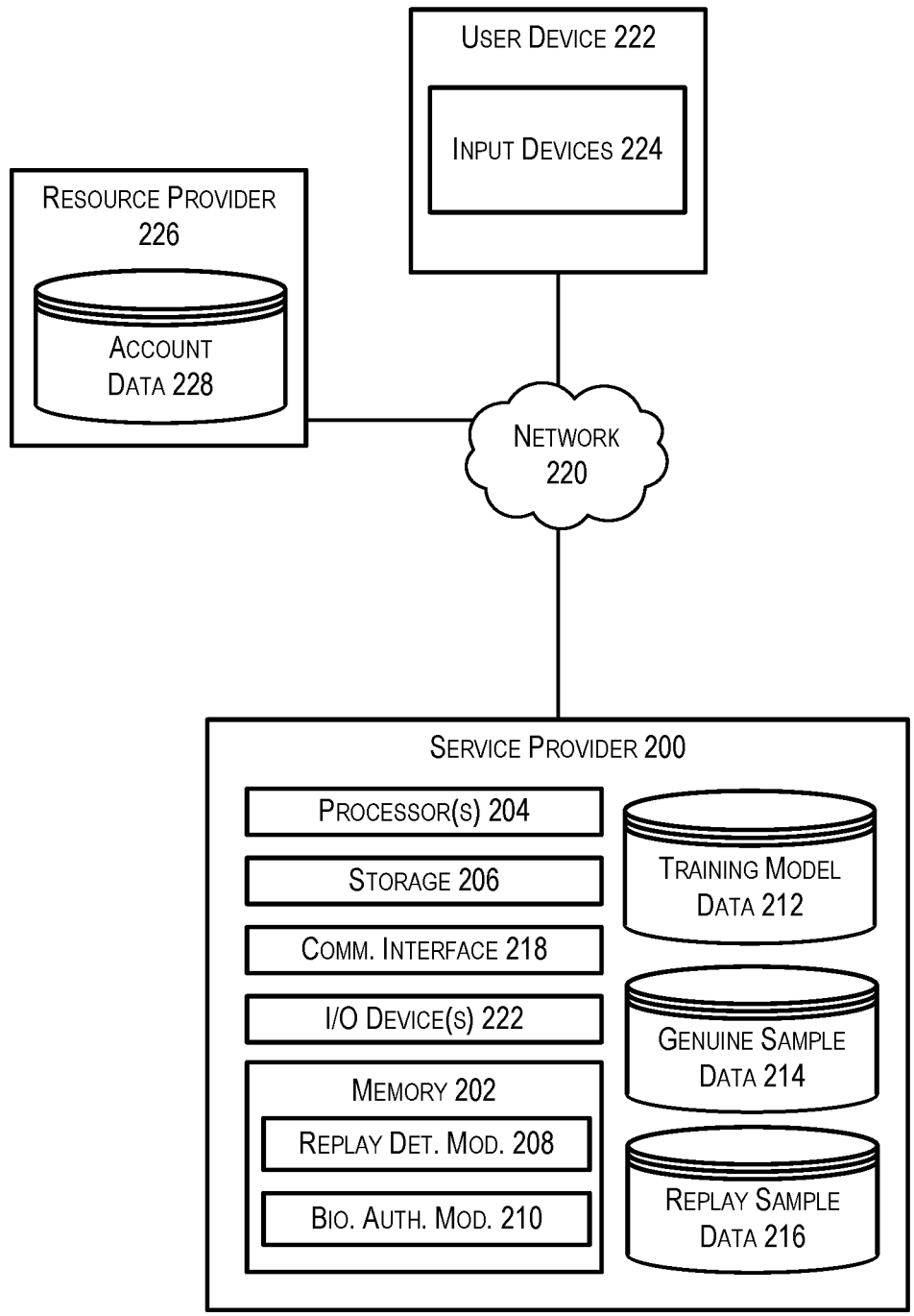
FIG. 2 depicts an illustrative example of a system or architecture in which techniques for providing access to resources in an account using biometric authentication may be implemented.

FIG. 2 depicts an illustrative example of a system or architecture in which techniques for providing access to resources in an account using biometric authentication may be implemented. In the depicted architecture, a service provider computer 200 may be in communication with a user device 222. In some embodiments, the service provider 200 and/or the user device 222 may further be in communication with a resource provider 226. Service provider 102 may be an example of service provider 102 depicted in FIG. 1. Similarly, user device 222 may be an example of input device 112 depicted in FIG. 1.

The service provider computer 200 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, one or both of the depicted computing devices may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider computer 200 may include at least one memory 202 and one or more processing units (or processors) 204. The processor(s) 204 may be implemented as appropriate in hardware, computer-executable instructions, firmware or combinations thereof. Computer-executable instruction or firmware implementations of the processor(s) 204 may include computer-executable or machine executable instructions written in any suitable programming language to perform the various functions described. The memory 202 may store program instructions that are loadable and executable on the processor(s) 204, as well as data generated during the execution of these programs. Depending on the configuration and type of service provider computer 200, the memory 202 may be volatile (such as random access memory (RAM)), non-volatile (such as read-only memory (ROM), flash memory, etc.), or some combination of the two. The service provider computer 200 may also include additional storage 206, such as either removable storage or non-removable storage including, but not limited to, magnetic storage, optical disks, and/or tape storage.

Turning to the contents of the memory 202 in more detail, the memory 202 may include an operating system 208 and one or more application programs or services for implementing the features disclosed herein including at least a replay detection module 208 that, when used in conjunction with the processor(s) 204, is configured to determine whether a provided biometric sample is genuine or a replay. In some embodiments, the memory 202 may also include biometric authentication module 210 that, when used in conjunction with the processor(s) 204, is configured to determine whether a biometric sample provided by a user is authentic. The memory 202 may also include a number of data stores, including training model data 212, which maintains information related to a training model used by the replay detection module 208, genuine sample data values 214, which maintains data values that have been determined to be genuine (e.g., received directly from a user), and replay sample data values 216, which maintains data values that have been determined to be replays (e.g., received directly from a recording device).

In some embodiments, the replay detection module 208 may comprise code, executable by the processor(s) 204 to receive a biometric sample (e.g., an audio sample) submitted by a user in an access request and determine a likelihood as to whether the biometric sample is genuine. In some embodiments, this may involve subjecting the biometric sample to a training model configured and trained as described in greater detail below. In some embodiments, the replay detection module 208 may determine whether the resulting likelihood as to whether the biometric sample is genuine is above or below a threshold data value. If the determined likelihood is below the threshold value, then the replay detection module 208 may be configured to reject the biometric sample as being a replay. If the determined likelihood is above or equal to the threshold value, then the replay detection module 208 may be configured to return an indication that the biometric sample is likely genuine and/or submit the biometric sample to the biometric authentication module 210 as described below.

In some embodiments, the biometric authentication module 210 may comprise code, executable by the processor(s) 204 to determine a likelihood as to whether the biometric sample matches that expected of a user associated with the biometric sample. In some embodiments, this may involve comparing "landmarks" or relationships in the biometric sample to corresponding landmarks or relationships stored in biometric information stored in relation to that user. It should be noted that one skilled in the art would be familiar with biometric authentication techniques that could be used by the biometric authentication module 210. It should be noted that an ASV module 106, as depicted in, and described in relation to, FIG. 1 is an example of a biometric authentication module 210.

The service provider computer 200 may also contain communications interface(s) 218 that enable the service provider computer 200 to communicate with a stored database, another computing device or server, one or more remote devices, and/or any other suitable electronic devices. In some embodiments, the communication interface 218 may enable the service provider computer 200 to communicate with other electronic devices on a network 220 (e.g., on a private network). The service provider computer 200 may also include input/output (I/O) device(s) and/or ports 222, such as for enabling connection with a keyboard, a mouse, a pen, a voice input device, a touch input device, a display, speakers, a printer, etc. In some embodiments, the service provider computer 200 may be in communication with a user device 222 and/or a resource provider 226 via the network 220.

In some embodiments, the network 220 may include any one or a combination of many different types of networks, such as cable networks, the Internet, wireless networks, cellular networks, and other private and/or public networks. While the illustrated example depicts various electronic devices accessing the service provider computer 200 over the network 220, the described techniques may equally apply in instances where the electronic devices interact with the service provider computer 200 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

The user device 222 may be any type of computing device such as, but not limited to, a mobile phone, a smart phone, a personal digital assistant (PDA), a laptop computer, a desktop computer, a server computer, a thin-client device, a tablet PC, etc. The user device 222 may include a memory 202 and one or more processors 204 capable of processing user input. The user device 222 may also include one or more input sensors 224, such as a camera, a microphone, accelerometers, a fingerprint scanner, or other suitable device for receiving user input. As is known in the art, there are a variety of input sensors capable of detecting user input, each of which may be included in the user device 222. The user input obtained by the input sensors 224 may be from a variety of data input types, including, but not limited to, audio data, visual data, or biometric data. In some embodiments, input sensors 224 may include a number of different types of camera devices, one or more of which may be a range camera device (e.g., a depth sensor) capable of generating a range image, and another of which may be a camera configured to capture image information. Accordingly, biometric information obtained via input sensors 224 may include image information and/or depth information (e.g., a range map of a face).

Figure 3:
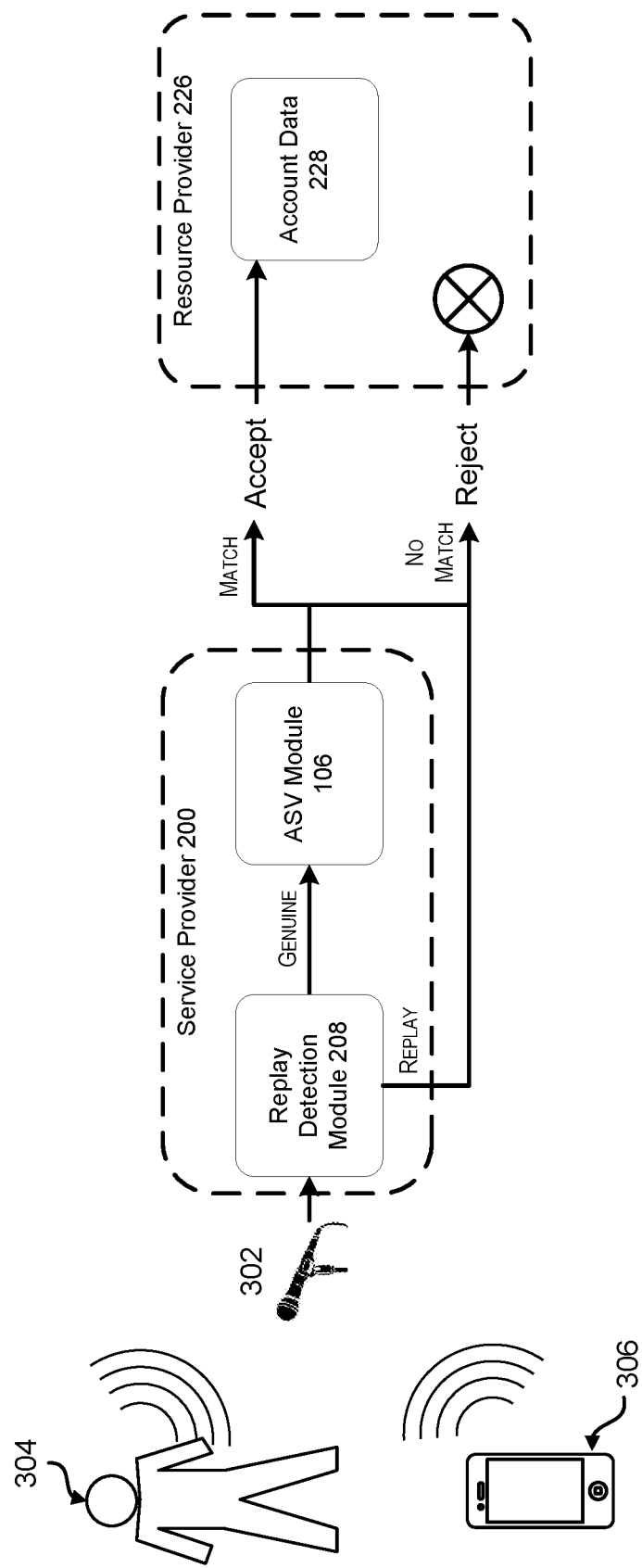
FIG. 3 depicts an illustrative block diagram in which a replay spoofing detection module is used in conjunction with an ASV module to filter out replay records in order to protect a resource provider from replay spoofing.

The resource provider 226 may be any suitable type of computing device that manages access to a resource. The resource provider 226 may include a memory and one or more processors capable of processing computer executable instructions. The resource provider 226 may also include account data 228, which may include sensitive information pertaining to one or more accounts maintained by the resource provider 226. It should be noted that in some embodiments, the service provider 200 may provide biometric authentication services for the resource provider 226. For example, the resource provider 226 may require that, in order for a user to access an account, that user submit a biometric sample for authentication along with an access request. In this example, the resource provider 226 may provide the biometric sample to the service provider 200 and may receive, in response, an indication as to whether to accept or reject the access request. It should be noted that while the service provider 200 and resource provider 226 are depicted as being separate entities, FIG. 3 depicts an illustrative block diagram in which a replay spoofing detection module is used in conjunction with an ASV module to filter out replay records in order to protect a resource provider from replay spoofing. In FIG. 3, the replay detection module 208 may be an example of the replay detection module 208 described with respect to FIG. 2 above. Likewise, the ASV Module 106 may be an example of the ASV module 106 described with respect to FIG. 1 above, which may be a type of the biometric authentication module 210 described with respect to FIG. 2 above.

As depicted, the service provider 200 may receive input from an input device 302 (e.g., a microphone), which is then provided to the replay detection module 208. In some embodiments, the input device 302 may be connected directly to the service provider 200. In some embodiments, the input device 302 may be included on a separate device (e.g., a mobile phone) in communication with the service provider 200. The input may be either genuine, in which case it is received directly from a user 304, or it may be a replay, in which case it is received as playback from a device 306 capable of recording and playing back input data.

Once the input is received from the input device 302 by the replay detection module 208, the replay detection module 208 may be configured to determine a likelihood that the input is a replay. To do this, the replay detection module 208 may subject the input to a previously-generated training model to see where the result ends up in relation to a genuine center. Using the one-class loss function, this may involve determining whether the result is greater than some threshold distance away from the genuine center. In some embodiments, the likelihood that an input is a replay (or genuine) may be represented as a percentage or other proportional value. In some cases, the likelihood value may correspond to the distance of the result from the genuine center. In some embodiments, the determined likelihood may then be compared to a threshold value that represents whether the input data is genuine or a replay. If the input data is determined to be a replay, then the input data may be rejected. If the input data is determined to be genuine, then the input data may be further analyzed to authenticate that input data.

To authenticate the input data, that input data may be provided to the ASV module 106. In some embodiments, only input data determined to be genuine may be provided to the ASV module 106 to prevent unnecessary processing. To authenticate the input data, the ASV Module 106 may retrieve biometric data stored in relation to the user from which the input data is alleged to have originated. In some embodiments, the service provider 200 may store or have access to biometric information for each user that maintains an account with either the service provider 200 or a resource provider 226 for whom the service provider 200 is performing biometric authentication. Once retrieved, the biometric information for the user may be compared to the received input data to determine a degree to which the data matches. If the degree to which the data matches is lower than some threshold value, then the input data may fail to be authenticated and may subsequently be rejected.

If the degree to which the data matches is greater than the threshold value, then the input data may be authenticated. In some embodiments, an access request related to the received input data may be granted, providing the requestor with access to account data 228. In some embodiments, an access request related to the received input data may be granted and a user may be provided access to a secure area or space.

Figure 4:
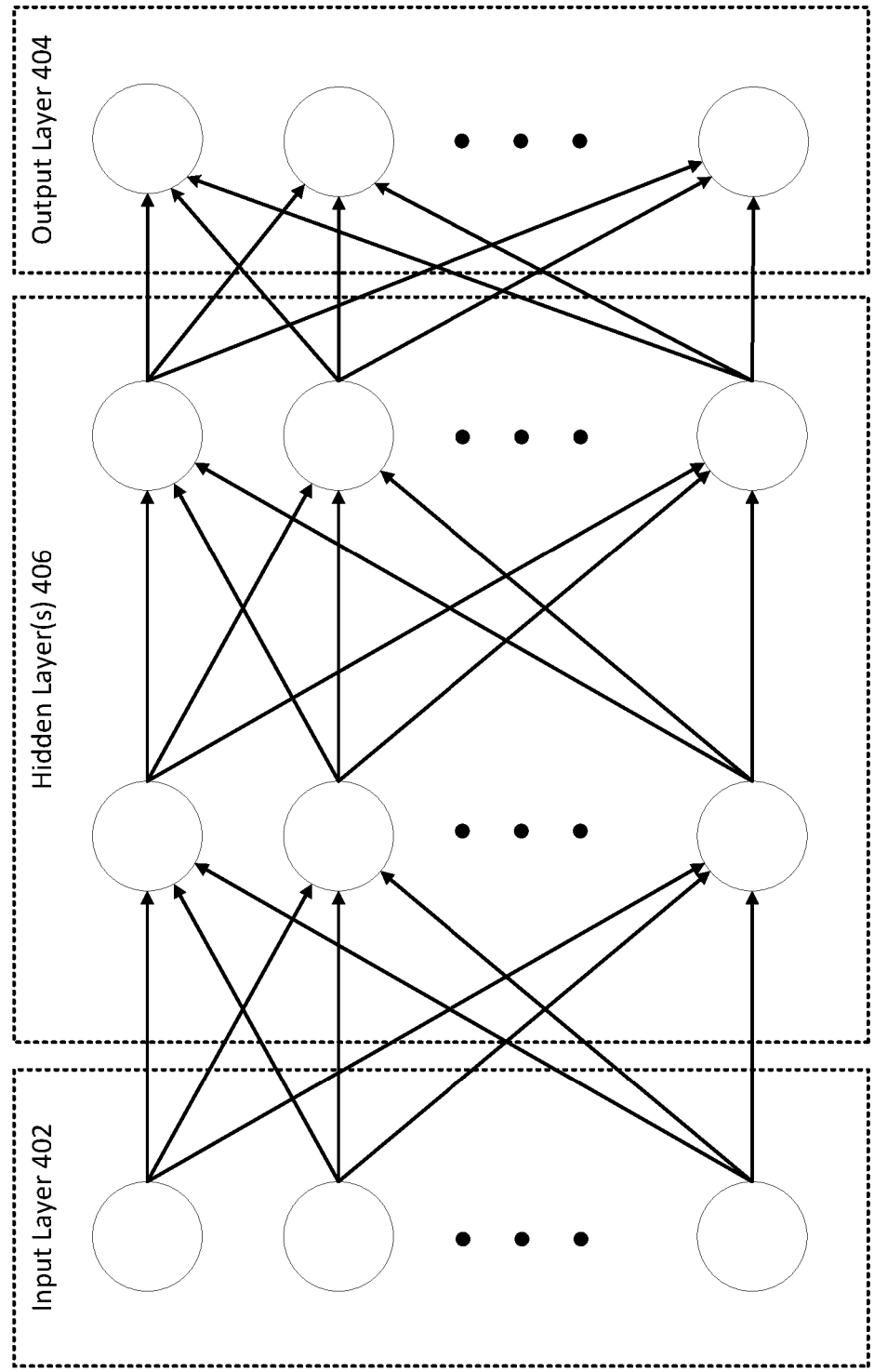
FIG. 4 depicts an illustrative example of an overview of a neural network that may be used in accordance with at least some embodiments.

FIG. 4 depicts an illustrative example of an overview of a neural network that may be used in accordance with at least some embodiments. In particular, FIG. 4 depicts an artificial neural network 400 type machine learning model.

As illustrated, the artificial neural network 400 includes a series of layers, each representing a set of nodes. On one side of the series of layers exists an input layer 402. The input layer 402 includes a set of nodes that are referred to herein as input nodes. Each of these input nodes may be mapped to a particular feature of an object model or an object model itself. In some embodiments, each "feature" may actually comprise a combination of other features. For example, a feature may comprise a number of data points, a label associated with those data points (e.g., a region label), a position of the data points with respect to the rest of the object model, or any other suitable feature.

On the other side of the series of layers is an output layer 404. The output layer 404 includes a number of output nodes. Each of the output nodes may be mapped to an object model associated with a particular category of object. In some embodiments, each output node may be mapped to a region of a number of regions associated with an object model provided as input.

One or more hidden layers 406 separates the input layer 402 and the output layer 404. The set of hidden layers 406 includes "N" number of hidden layers, where "N" is an integer greater than or equal to one. In turn, each of the hidden layers also includes a set of nodes that are referred to herein as hidden nodes.

On one side of the hidden layers 406, hidden nodes are interconnected to the input nodes. Each of the input nodes may be connected to each of the hidden nodes of the hidden layer connected to the input layer 402. On the other side of the hidden layer 406, hidden nodes are connected to the output nodes. Each of the output nodes may be connected to each of the hidden nodes of the hidden layer connected to the output layer 404. In other words, each input node connects to each hidden node in the hidden layer closest to the input layer 402 and each output node connects to each hidden node in the hidden layer closest to the output layer 404. The input nodes are not directly interconnected to the output nodes. If multiple hidden layers exist, the input nodes are interconnected to hidden nodes of the closest hidden layer only. In turn, these hidden nodes are interconnected to the hidden nodes of the next hidden layer and so on and so forth.

An interconnection may represent a piece of information learned about the two interconnected nodes. In comparison, a connection between a hidden node and an output node may represent a piece of information learned that is specific to the output node. The interconnection may be assigned a numeric weight that can be tuned (e.g., based on a training dataset), rendering the artificial neural network 400 adaptive to inputs and capable of "learning."

Generally, the hidden layer 406 allows knowledge about the input nodes of the input layer 402 to be shared amongst the output nodes of the output layer 404. To do so, an activation function $f$ is applied to the input nodes through the hidden layer 406. In an example, the activation function $f$ may be non-linear. Different non-linear activation functions $f$ are available including, for instance, a rectifier function $f(x)=\max(0, x)$. In an example, a particular non-linear activation function $f$ is selected based on cross-validation. For example, given known example pairs $(x, y)$, where $x \in X$ and $y \in Y$, a function $f: X \rightarrow Y$ is selected when such a function results in the best matches (e.g., the best representations of actual correlation data).

The artificial neural network 400 may also use one or more cost or loss functions to find an optimal solution (e.g., an optimal activation function). The optimal solution represents the situation where no solution has a cost less than the cost of the optimal solution. In an example, the cost function includes a mean-squared error function that minimizes the average squared error between an output $f(x)$ and a target value $y$ over the example pairs $(x, y)$. In some embodiments, a backpropagation algorithm that uses gradient descent to minimize the cost function may be used to train the artificial neural network 400. Using a backpropagation algorithm, the output values are compared with a correct answer to compute the value of some predefined error-function. By various techniques, the error is then fed back through the network. Using this information, the algorithm may adjust the weights of each connection in order to reduce the value of the error function by some small amount. In some embodiments, the artificial neural network 400 may be an autoencoder neural network, in which both inputs and outputs are provided to the artificial neural network during training and the autoencoder learns to reconstruct its inputs.

In the depicted artificial neural network 400, a prediction model may be generated such that the hidden layer 406 retains information (e.g., specific variable values and/or transformative functions) for a set of input values and output values used to train the artificial neural network 400. This retained information may be applied to a new biometric data in order to identify a likelihood that the biometric data is genuine. In some embodiments, the artificial neural network 400 may be trained on samples having known classifications (e.g., genuine or replay). For example, an artificial neural network 400 may be used to generate a prediction model using inputs that include a plurality of known genuine input samples and known replay input samples where the results are optimized to minimize a distance between results for the genuine samples from a genuine center and maximize results for the replay samples from that center. In this example, the resulting prediction model may be applied to raw biometric input in order to generate a result for that biometric input in relation to the results for the known samples.

By way of illustration, a neural network as depicted in FIG. 4 may be trained using both known genuine samples and known replay samples as inputs. Each of the output nodes in this example may represent results positioned within a hyperspace. When a new biometric data is presented as input to the trained neural network, the neural network will output a result which can be assessed based on its position within the hyperspace.

Figure 5:
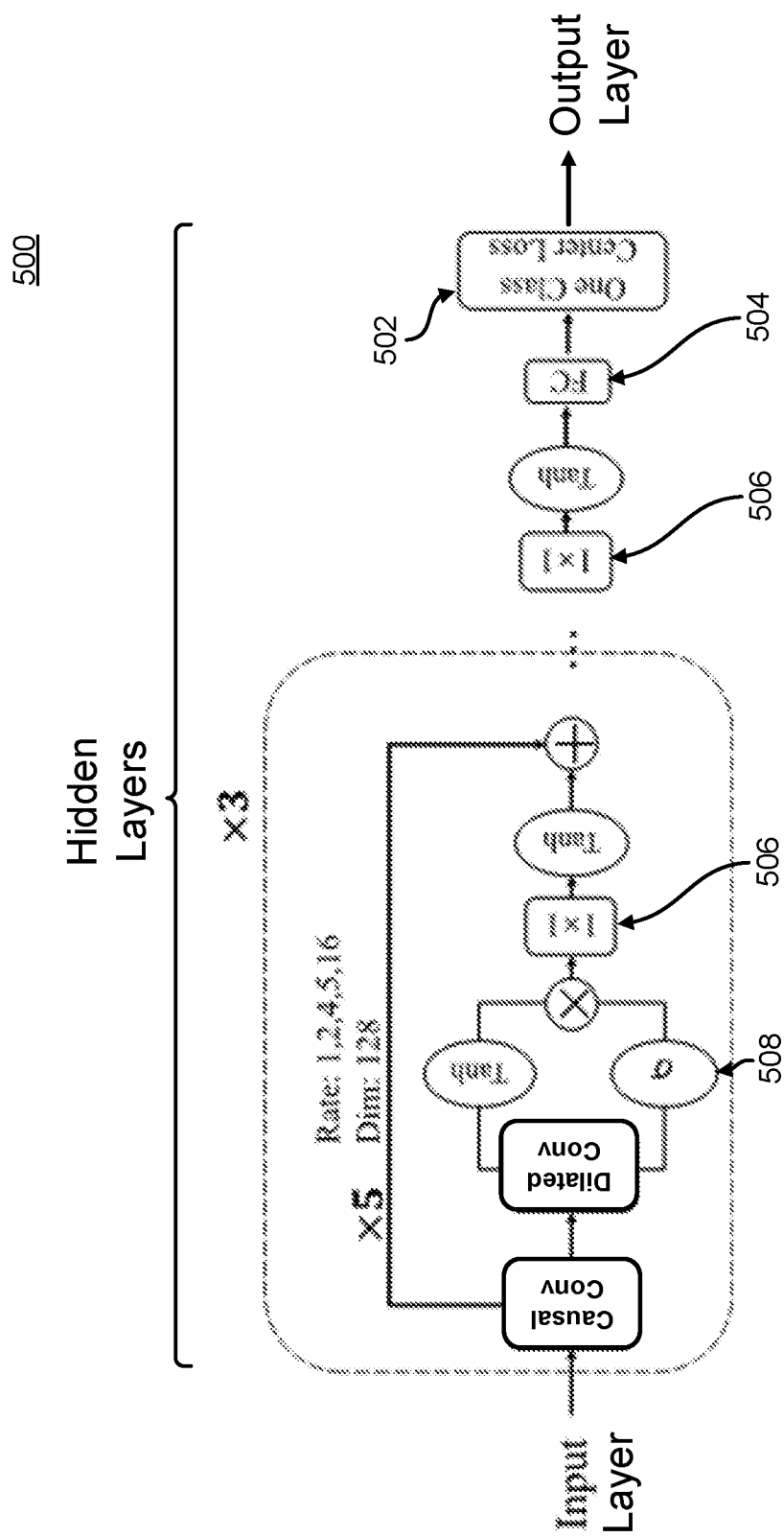
FIG. 5 depicts an example of an architecture for a convolutional neural network model that may be implemented to embed the raw biometric data directly into a feature space in accordance with at least some embodiments.

FIG. 5 depicts an example of an architecture for a convolutional neural network model that may be implemented to embed the raw biometric data directly into a feature space in accordance with at least some embodiments. In a convolutional neural network, a convolutional layer is responsible for the systematic application of one or more filters to an input. According to embodiments of the invention, a convolutional neural network model may be used to embed the raw audio data directly into feature space $x_i = f(r_i)$ without needing to transform that data into a spectrum (as is typically required to process data). A particular architecture is depicted by way of FIG. 5, which includes a number of hidden layers as described.

As depicted, the convolutional neural network model may include a loss layer 502, and more particularly, a one class center loss layer. As also depicted, a fully connected layer 504 may be added before the loss layer 502 in order to embed the input into a discriminative feature vector. Additionally, in some embodiments, the convolutional neural network may also comprise strides 506, one or more activation functions 508, which may use either sigmoid (o') or tahn functions, a dilated convolutional layer 510 and a causal convolutional later 512.

The causal convolutional layer 512 and the dilated convolutional layer 510 can be used for processing raw audio data without transforming the audio data into a spectrum. The causal convolutional layer 512 can process data in the audio file based on a current data point and data before the current point. This may be in contrast to a traditional convolutional layer that processes data before and after the current point. The dilated convolutional layer 510 may apply a filter over a wide area with a relatively small number of parameters. A dilated convolutional layer 510 can allow a CNN to identify features on multiple scales. The combination of the causal convolutional layer 512 and the dilated convolutional layer 510 can allow for audio processing.

The raw audio data may be long and may be difficult to analyze efficiently. A stride 506 may be used to down sample the audio data to make it easier to process. When using a convolutional layer, the layer may be passed through the data one element at a time. Typically, the filter is moved down one element at a time, but in a stride 506 the filter can be passed through the data and skip a number of elements, thus decreasing the number of data points in the output of the filter layer.

A block comprising the causal convolutional layer 512, the dilated convolutional layer, one or more activation functions 508, and strides 506 may comprise a block that is repeated multiple times in the CNN. For example, the block may be repeated 5 times.

During training of the depicted convolutional neural network model, all parameters will be learned for the convolutional neural network model $f(*)$, the genuine class center c, and a threshold t. Given a testing audio sample $r_j$, the corresponding class label is estimated simply via $$\hat{y}_j = \begin{cases} 0, & \text{if } \|f(r_i) - c\|_2 < t \\ 1, & \text{if } \|f(r_i) - c\|_2 \geq t \end{cases}.$$

where $\|f(r_i) - c\|_2$ is the Euclidean distance between the center and an output of a particular audio sample.

If the distance between a test sample and the genuine center is larger than the threshold t, then it is considered as a replay sample.

In the training phase, there are a set of audio samples $\{(r_i, y_i) | y_i = 0 \text{ or } 1\}$, where $r_i$ is the raw audio data, and $y_i$ is its corresponding class label with $y_i = 0$ denotes genuine sample and $y_i = 1$ denotes replay sample. The convolutional neural network can be trained using a one class loss function. The one class loss function can be a divisional one class center loss function or a marginal one class center loss function.

When training the model, the objective is to optimize an embedding $x_i = f(r_i)$ such that the genuine samples (i.e., $y_i = 0$) lies closer to the genuine center, and the replay samples (i.e., $y_i = 1$) lies further from the genuine center. To this end, two loss functions may be used to achieve this objective, namely divisional one class center loss and marginal one class center loss. The divisional one class center loss is defined as $$\mathcal{L}_{DC} = \frac{\left(\frac{1}{2N^+} \sum_{y_i=0} \|x_i - c\|_2^2\right)}{\left(\frac{1}{2N^-} \sum_{y_i=1} \|x_i - c\|_2^2\right)}$$

The numerator is the average distance between genuine samples ($y_i = 0$) and genuine center c, where $N^+$ is the number of genuine samples and $\|x_i - c\|_2^2$ is the square of the Euclidean norm of the distance between an embedding $x_i$ and the center c. The denominator is the average distance between replay samples and ($y_i = 1$) and genuine center. Optimizing the function $f(*)$ and the location of the center c can result in genuine samples that are closer to the center, thus minimizing the numerator and minimizing the loss function $\mathcal{L}_{DC}$. Similarly, the optimization can result in replay samples that are farther from the center, thus maximizing the denominator and minimizing the loss function $\mathcal{L}_{DC}$. By minimizing $\mathcal{L}_{DC}$, genuine samples are pulled closer to each other, and the replay samples are pushed farther from the genuine center. Then, a threshold t can be determined around the center c such that genuine samples fall within the threshold t and replay samples fall outside the threshold t.

However, using the divisional one class center loss, it can be difficult to control how much to push the replay sample. To this end, the marginal one class center loss is defined as $$\mathcal{L}_{DC} = \frac{1}{2} \sum_{y_i=0} \|x_i - c\|_2^2 + \frac{1}{2} \lambda \sum_{y_i=1} |m - \|x_i - c\|_2^2|_+,$$

where the first term is intended to move genuine samples closer the genuine center c, and wherein the second term is intended to push a replay sample farther from the genuine center by a margin m. Thus the goal of marginal one class center loss may be to arrange genuine samples close to the center c, within some threshold t, and to arrange the replay samples far from the center c, beyond some margin m. The first term may be similar to the numerator of the divisional one class center loss function. In the second term, the $|*|_+$ is the hinge loss, which is a loss function that increases linearly for samples that are not correctly classified and is 0 for samples that are correctly classified. Thus replay samples that are outside the margin (and thus have been correctly identified) may not contribute to the loss, because their hinge loss is 0, focusing the optimization on clearing the margin of replay samples. The parameter λ is the tradeoff parameter between two terms. The tradeoff parameter can control the constraints on the genuine samples and replay samples. Marginal one class center loss can facilitate choosing a threshold t that separates genuine samples from replay samples because there may be a greater distinction between the two classes.

Figure 6:
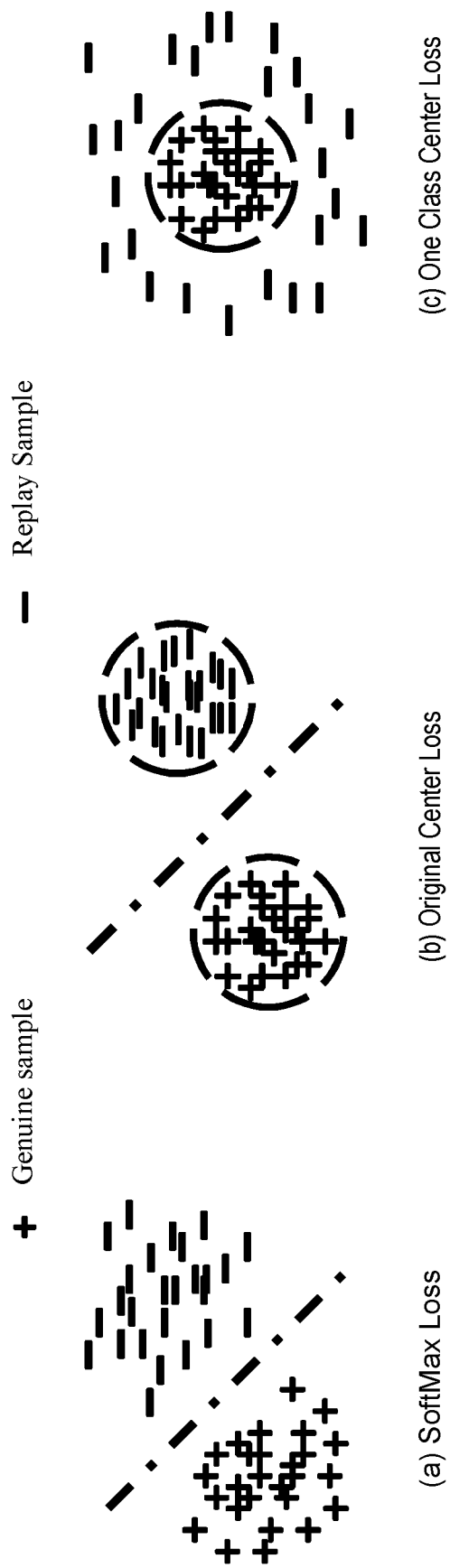
FIG. 6 depicts various illustrative representations of result sets that may be returned for a number of different loss functions.

FIG. 6 depicts various illustrative representations of result sets that may be returned for a number of different loss functions. As previously noted, one of the major limitations of conventional approaches is that they don't generate well to unseen replay configurations (e.g., different background noise, replay and recording devices). To this end, the replay spoofing detection module 208 may be formulated as a one-class classification problem for which is proposed a group of new loss functions wherein the replay spoof samples are less restricted.

As depicted in (a) is a result set associated with a SoftMax loss function. Conventionally, the SoftMax loss function, for which the results are optimized into separate areas of an embedding space, is the most commonly used loss function in CNN-based approaches. The SoftMax loss function maps the input features into hyperspace and learns a decision boundary between the genuine samples (plusses) and replay samples (minuses).

As depicted in (b), in the original center loss function, samples from each class are optimized to be close to their corresponding class center in the learned embedding space. Accordingly, results in such a loss function are typically separated and clustered by class within that space.

As depicted in (c), in the proposed one-class center loss, there is only one class center for genuine samples. The model is optimized to push replays farther from the genuine center and pull genuine samples inward. In this model, replays may be associated with values that fall outside of some threshold t.

Figure 7:
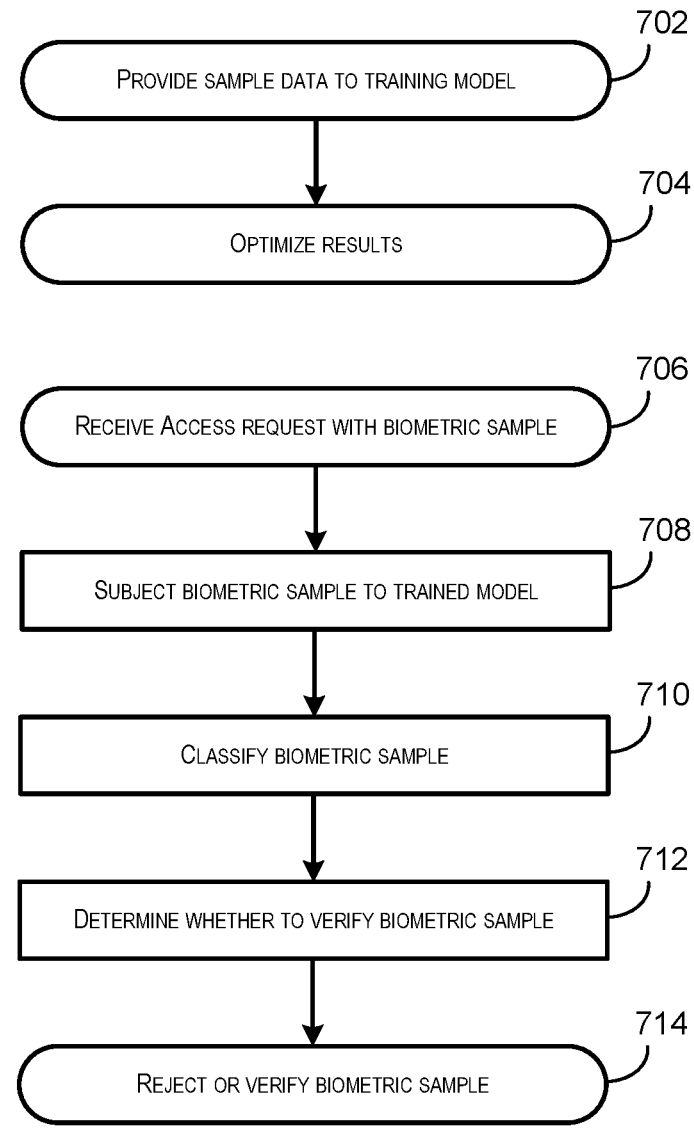
FIG. 7 depicts an example of a block diagram illustrating a process for providing replay detection in accordance with at least some embodiments.

FIG. 7 depicts an example of a block diagram illustrating a process for providing replay detection in accordance with at least some embodiments. The process 700 may be performed by the service provider 200 described with respect to FIG. 2 above.

Process 700 may begin at 702, when an machine learning model managed by the service provider computer is trained. In some embodiments, the machine learning model is a convolutional neural network. The convolutional neural network may include a layer that applies a one class loss function. The one class loss function may be a divisional one class center loss function or a marginal one class center loss function. The convolutional neural network may also include a fully connected layer which is connected to the layer including the one class loss function.

To train the machine learning model, the service provider computer may provide a set of genuine sample data and a set of sample replay data. For example, the service provider computer may obtain known data sets from an entity which maintains such data sets. For example, a data set that provides audio data and is available publicly can include ASVspoof17.

At 704, the process 700 may involve optimizing the machine learning model. Once the sample data sets have been processed by the machine learning model, output data for each of the data samples is produced. Various weights and other factors within the machine learning model are then adjusted to move results in the output data to a more optimal position. In particular, the service provider adjusts the machine learning model to optimize the output data such that results of the set of genuine sample data are moved closer to a genuine center and the results of the set of replay sample data is pushed away from the genuine center. A threshold t may then be determined between the results of the set of genuine sample data and the results of the set of replay sample data, such that results that lie within the threshold t may be classified as genuine and results that lie beyond the threshold t may be classified as replays. In some embodiments that use marginal one class center loss, a margin m may also be determined where m>t and results that lie beyond the margin m are classified as replays. Once the machine learning model has been trained in the above manner, it can be used to process new biometric data.

At 706, the process 700 may involve receiving input biometric data associated with a user. In some embodiments, the input biometric data may be audio data which has not been transformed into a spectrum. In some embodiments, the input biometric data may be received in relation to an access request (e.g., a request to access account or other sensitive data).

At 708, the process 700 may involve subjecting the input biometric data to the machine learning model resulting in the production of an output result for the input biometric data. The input biometric data may then be classified as genuine or replay based on the output result for the input biometric data at 710. In some embodiments, the classification is determined based on a distance between the genuine center and a result of the input biometric data. For example, if the result of the input biometric data lies outside the threshold t (e.g., the distance between the genuine center and the result of the input biometric data is greater than t) the input biometric data may then be classified as replay.

At 712, the process 700 may involve determining, by the service provider computer, whether or not to verify the input biometric data based on the classification. In some embodiments, determining whether or not to verify the input biometric data based on the classification comprises determining whether the result of the input biometric data is greater than some threshold distance from the genuine center.

At 714, the process 700 may further involve either rejecting or verifying the input biometric data. If the input biometric data is rejected, the process 700 may be terminated and an access request associated with the input biometric data may be declined. If the input biometric data is not rejected, then it may be verified by being compared to biometric data stored in relation to the user from which the input biometric data has been indicated as being received.

Embodiments of the disclosure provide several technical advantages over conventional systems. For example, one of the major limitations of conventional approaches is that they don't generalize well to unseen replay configurations (e.g., different background noise, replay and recording devices). Additionally, the system described can process raw biometric (e.g., audio) data directly, without transforming it into the spectrum (e.g. frequency domain representation). As proposed herein, the convolutional neural network structure has been adapted to embed the replay information into a discriminative feature space. This results in a much greater accuracy for the results, as well as the ability to account for unseen replay configurations.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
    training, by a service provider computer, a machine learning model by:
        providing a set of genuine sample data;
        providing a set of replay sample data; and
        optimizing the machine learning model such that results of the set of genuine sample data are closer to a genuine center and the results of the set of replay sample data are further away from the genuine center;
    receiving, by the service provider computer, input biometric data associated with a user;
    subjecting, by the service provider computer, the input biometric data to the machine learning model resulting in a classification as genuine or replay; and
    determining, by the service provider computer, whether or not to verify the input biometric data based on the classification,
    wherein the machine learning model is a convolutional neural network,
    wherein the convolutional neural network includes a one class loss function, and
    wherein the one class loss function is a divisional one class center loss function, or a marginal one class center loss function,
    wherein the divisional one class center loss function includes a loss $\mathcal{L}_{DC}$:

$$\mathcal{L}_{DC} = \frac{\left(\frac{1}{2N^+}\sum_{y_i=0} \|x_i - c\|_2^2\right)}{\left(\frac{1}{2N^-}\sum_{y_i=1} \|x_i - c\|_2^2\right)}$$

wherein the marginal one class center loss function includes a loss $\mathcal{L}_{DC}$:

$$\mathcal{L}_{DC} = \frac{1}{2}\sum_{y_i=0} \|x_i - c\|_2^2 + \frac{1}{2}\lambda \sum_{y_i=1} |m - \|x_i - c\|_2^2|_+,$$

wherein ($y_i=0$) indicates a genuine sample, c indicates a genuine center, ($y_i=1$) indicates a replay sample, $N^+$ is a number of genuine samples, $N^-$ is a number of replay samples, $x_i$ is an embedding, m is a margin, and $\lambda$ is a tradeoff parameter.

2. The method of claim 1, wherein a layer including the one class loss function is connected to a fully connected layer.

3. The method of claim 1, wherein the input biometric data is audio data which has not been transformed into a spectrum.

4. The method of claim 1, wherein the classification is determined based on a distance between the genuine center and a result of the input biometric data.

5. The method of claim 4, wherein determining whether or not to verify the input biometric data based on the classification comprises determining whether the result of the input biometric data is greater than some threshold distance from the genuine center.

6. The method of claim 1, further comprising upon determining to verify the input biometric data, comparing the input biometric data to a biometric sample stored in relation to the user.

7. A service provider computer comprising
    a processor;
    a memory; and
    a computer readable medium coupled to the processor, the computer readable medium comprising code, executable by the processor, to implement a method comprising:
    training a machine learning model by:
        providing a set of genuine sample data;
        providing a set replay sample data; and
        optimizing the machine learning model such that results of the set of genuine sample data are closer to a genuine center and the results of the set of replay sample data are further away from the genuine center,
    receiving input biometric data associated with a user;
    providing the input biometric data to the machine learning model as input resulting in a classification as genuine or replay; and
    determining whether or not to verify the input biometric data based on the classification,
    wherein the machine learning model is a convolutional neural network, wherein the convolutional neural network includes a one class loss function, and wherein the one class loss function is a divisional one class center loss function, or a marginal one class center loss function, wherein the divisional one class center loss function includes a loss $\mathcal{L}_{DC}$:

$$\mathcal{L}_{DC} = \frac{\left(\dfrac{1}{2N^+}\sum_{y_i=0}\|x_i - c\|_2^2\right)}{\left(\dfrac{1}{2N^-}\sum_{y_i=1}\|x_i - c\|_2^2\right)}$$

wherein the marginal one class center loss function includes a loss $\mathcal{L}_{DC}$:

$$\mathcal{L}_{DC} = \frac{1}{2}\sum_{y_i=0}\|x_i - c\|_2^2 + \frac{1}{2}\lambda\sum_{y_i=1}|m - \|x_i - c\|_2^2|_+,$$

and wherein ($y_i$=0) indicates a genuine sample, c indicates a genuine center, ($y_i$=1) indicates a replay sample, $N^+$ is a number of genuine samples, $N^-$ is a number of replay samples, $x_i$ is an embedding, m is a margin, and $\lambda$ is a tradeoff parameter.

8. The service provider computer of claim 7, wherein a layer including the one class loss function is connected to a fully connected layer.

9. The service provider computer of claim 7, wherein the input biometric data is audio data which has not been transformed into a spectrum.

10. The service provider computer of claim 7, wherein the classification is determined based on a distance between the genuine center and a result of the input biometric data.

11. The service provider computer of claim 10, wherein determining whether or not to verify the input biometric data based on the classification comprises determining whether the result of the input biometric data is greater than some threshold distance from the genuine center.

12. The service provider computer of claim 7, wherein the method further comprises upon determining to verify the input biometric data, comparing the input biometric data to a biometric sample stored in relation to the user.

* * * * *